United States Patent
Morimoto et al.

[11] Patent Number: 6,102,573
[45] Date of Patent: Aug. 15, 2000

[54] ROLLER CHAIN

[75] Inventors: Masaru Morimoto, Osaka-fu; Minoru Koide, Kyoto-fu; Tomonobu Shibamoto, Osaka-fu, all of Japan

[73] Assignee: Tsubakimoto Chain Co., Osaka, Japan

[21] Appl. No.: 09/294,041

[22] Filed: Apr. 19, 1999

[30] Foreign Application Priority Data

Apr. 27, 1998 [JP] Japan .................................. 10-116869

[51] Int. Cl.⁷ .................................................. F16C 21/00
[52] U.S. Cl. .......................... 384/127; 384/420; 384/469; 384/569; 384/587
[58] Field of Search .................................. 384/127, 469, 384/420, 569, 587

[56] References Cited

FOREIGN PATENT DOCUMENTS

| 4-78523 | 1/1987 | Japan . |
| 9-14269 | 1/1997 | Japan . |

*Primary Examiner*—Lenard A. Footland
*Attorney, Agent, or Firm*—Dann, Dorfman, Herrell and Skillman; Henry H. Skillman

[57] ABSTRACT

A roller chain includes a sintered oil-impregnated bushing loosely fitted coaxially on a connection pin for outer plates, a roller fitted for rotation on and around the sintered oil-impregnated bushing, and a needle roller bearing interposed between the sintered oil-impregnated bushing and the roller and having grease charged therein. Lubricant of the sintered oil-impregnated bushing side and the grease of the needle roller bearing side supplement oil components to each other and the overall amounts of the grease and the lubricant of the roller chain can be effectively utilized to allow the roller chain to be used without supplement lubricant for a long period of time. Thus, the roller chain can suppresses a local out-of-oil condition and make effective use of the overall amount of available oil components of grease to assure a reduced frictional resistance upon running of the roller chain for a long period of time thereby to exhibit a superior abrasion resistance and durability.

2 Claims, 3 Drawing Sheets

ROLLER CHAIN

BACKGROUND OF THE INVENTION

1. Field of the Invention

This invention relates to a roller chain, and more particularly to a roller chain for conveyance wherein the frictional resistance of the chain itself is low for a long period of time and smooth running of the chain is realized to achieve a superior abrasion resistance and durability.

2. Description of the Related Art

Various roller chains are conventionally known, and a roller chain which is improved in frictional resistance between contact faces of a roller and a bushing is disclosed, for example, in Japanese Patent Laid-Open Publication No. (HEI) 4-78523. In the roller chain, grease is charged in a roller bearing disposed between a bushing and a roller so that the roller bearing and the grease may reduce the frictional resistance between contact faces of the roller and the bushing to achieve reduction of the frictional resistance against rotation and elongation of the life of rotation of the roller.

Another roller chain which is improved in frictional resistance between contact faces of a connection pin and a bushing is shown, for example, in FIG. 2 of Japanese Patent Laid-Open publication No. (HEI) 9-14269. In the roller chain, a sintered oil-impregnated bushing is loosely fitted coaxially on a connection pin of a plate and a grease layer is formed at a bearing portion between the connection pin and the sintered oil-impregnated bushing. By a mutual action of lubricating oil impregnated in the sintered oil-impregnated bushing and the grease charged at the bearing portion, occurrence of an out-of-oil condition may be retarded to augment the life against friction between the connection pin and the sintered oil-impregnated bushing.

In such roller chains as described above, only the frictional resistance between contact faces of a bushing and a roller or between contact faces of a connection pin and a bushing is improved, but both of the frictional resistance between contact faces of a bushing and a roller and between contact faces of a connection pin and a bushing are not improved, and the life against friction as the entire roller chain cannot be achieved sufficiently.

In particular, while the former roller chain is improved in frictional resistance between contact faces of a bushing and a roller, it is not improved in frictional resistance between contact faces of a connection pin and a bushing, and the abrasion resistance and the durability of the entire chain are not sufficiently high. Further, the roller chain is subject to restriction in shape upon designing that a lubricant filling space for charging grease must be assured in a structure of the roller chain. Besides, as oil components of the grease are consumed, the grease becomes gradually solidified, resulting in increase in frictional resistance between the contact faces of the bushing and the roller. Consequently, the roller chain is disadvantageous in that the abrasion between the contact faces proceeds rapidly and this makes the roller chain fail to sufficiently exhibit a function of the roller chain itself.

On the other hand, with the latter roller chain, although it is improved in frictional resistance between contact faces of a connection pin and a bushing, since the improvement in frictional resistance between contact faces of a bushing and a roller, the abrasion resistance and the durability of the entire chain cannot be improved sufficiently. Further, since the connection pin and the bushing contact with and slide on each other by rocking motion over a fixed angle, the fluidity of the grease is low, and while a lubrication action functions with part of the grease which is present at the portions of the connection pin and the bushing at which they contact with and slide on each other and lubricant oozing out from the sintered oil-impregnated bushing, but the lubrication action does not function sufficiently at the other portions of the connection pin and the bushing at which they do not contact with and not slide on each other. Consequently, the roller chain is disadvantageous in that the life of the roller chain against abrasion is restricted by deterioration of the grease present at the portions of the connection pin and the bushing at which they contact with and slide on each other.

SUMMARY OF THE INVENTION

It is an object of the present invention to provide a roller chain which suppresses a local out-of-oil condition and can make effective use of the overall amount of oil components contained in grease to assure use of the roller chain for a long period of time without supplementing lubricant and besides can exhibit a reduced frictional resistance upon running of the roller chain for a long period of time thereby to exhibit a superior abrasion resistance and durability.

In order to attain the object described above, according to the present invention, there is provided a roller chain, comprising a sintered oil-impregnated bushing loosely fitted coaxially on a connection pin for outer plates, a roller fitted for rotation on and around the sintered oil-impregnated bushing, and a needle roller bearing interposed between the sintered oil-impregnated bushing and the roller and having grease charged therein.

It is to be noted that the compatibility between the lubricant impregnated in the sintered oil-impregnated bushing employed in the roller chain of the present invention and the grease charged in the needle bearing may be of any combination only if it does not cause decomposition of a component of them by a chemical reaction nor significant deterioration of the lubrication characteristic.

Then, the needle roller bearing may be of any type only if it forms a roller bearing wherein a large number of needle rollers are arranged and held in parallel on holding members in the form of inner and outer rings, and as the material for the needle roller bearing, any suitable combination of ceramics, steel and engineering plastics materials may be used taking the abrasion resistance, the durability and so forth into consideration.

With the roller bearing, since the needle roller bearing in which the grease is charged is interposed between the sintered oil-impregnated bushing and the roller, when the roller chain runs, the needle roller bearing slides on the outer periphery of the sintered oil-impregnated bushing by rotation of the running roller.

In this instance, since the individual needle rollers which form the needle roller bearing roll on the outer periphery of the sintered oil-impregnated bushing, the grease sticking to the individual needle rollers is transferred to the inner periphery of the roller. Consequently, a fresh film of the grease is normally formed on the inner periphery of the roller, and therefore, the frictional resistance between the roller and the needle roller bearing. Meanwhile, the grease sticking to the individual needle rollers is transferred also to the outer periphery of the sintered oil-impregnated bushing. Consequently, a fresh film of the grease is normally formed on the outer periphery of the sintered oil-impregnated bushing. Therefore, even if the lubricant impregnated in the sintered oil-impregnated bushing tends to pass through the film of the grease and leak out toward the roller, it is intercepted by the film of the grease and cannot leak out. Consequently, oil components of the lubricant impregnated in the sintered oil-impregnated bushing are assured effectively for a long period of time and the frictional resistance between the contact faces of the connection pin and the sintered oil-impregnated bushing.

Meanwhile, if oil components of the grease charged in the needle roller bearing side are used up, then oil components of the lubricant are supplied from the sintered oil-impregnated bushing through the film of the grease. Also when oil components of the lubricant on the sintered oil-impregnated bushing side are used up, oil components of the grease charged in the needle roller bearing side are supplemented to the lubricant on the sintered oil-impregnated bushing side by the same reason. Consequently, since the lubricant of the sintered oil-impregnated bushing side and the grease on the needle roller bearing side supplement oil components to each other, occurrence of a local out-of-oil condition of the roller chain can be suppressed. Accordingly, the overall amounts of the grease and the lubricant which the roller chain has can be utilized effectively a nd the roller chain can be used without supplementing lubricant for a long period of time. In this manner, the roller chain can realize smooth running with a reduced frictional resistance and can exhibit a superior abrasion resistance and durability.

It is to be noted that it is a matter of course that the frictional resistance between the contact faces of the connection pin and the sintered oil-impregnated bushing is reduced by the lubricant impregnated in the sintered oil-impregnated bushing and the frictional resistance between the contact faces of the sintered oil-impregnated bushing and the roller is reduced by the grease charged in the needle roller bearing.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
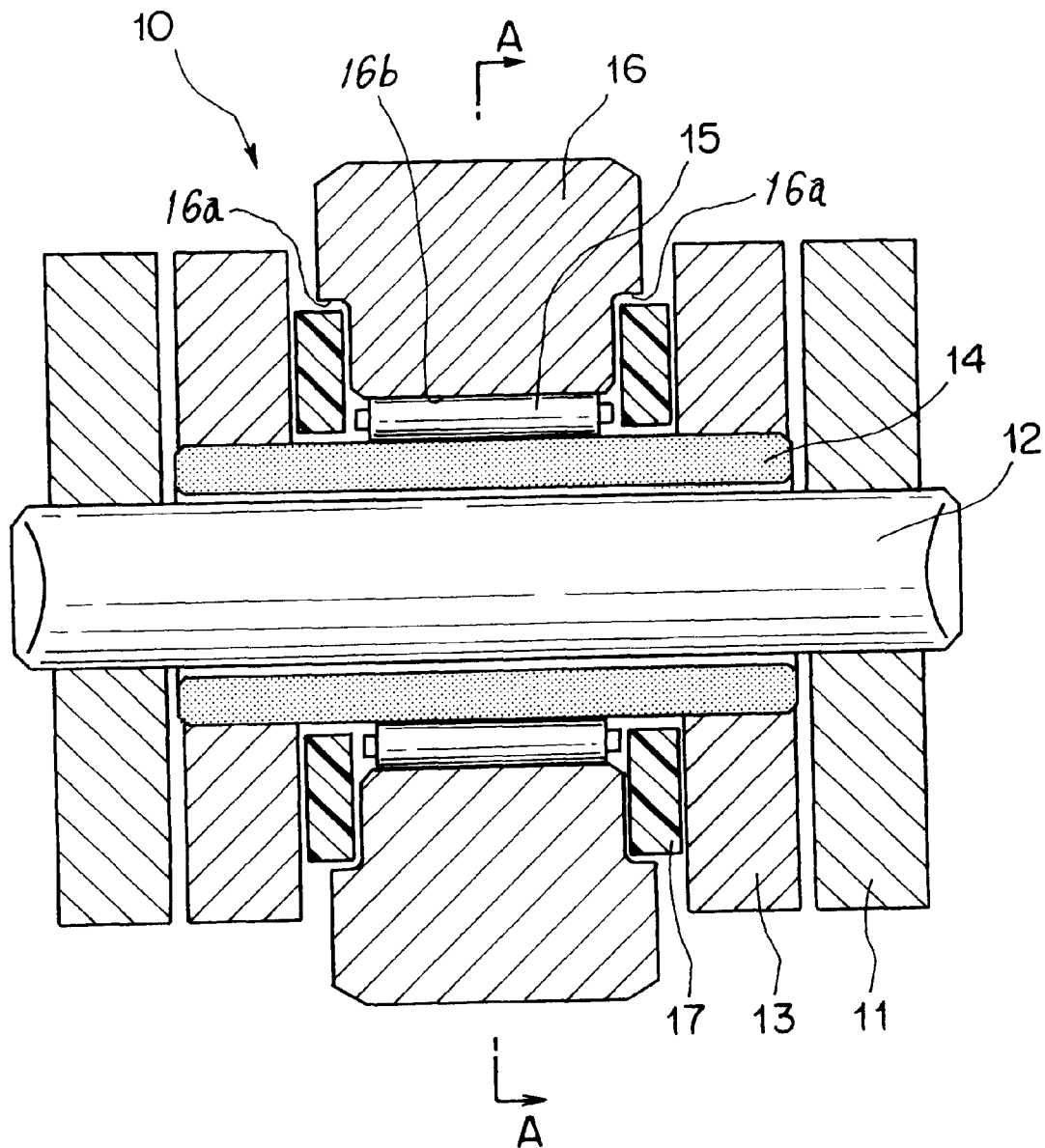
FIG. 1 is a sectional view of a roller chain to which the present invention is applied.
Figure 2:
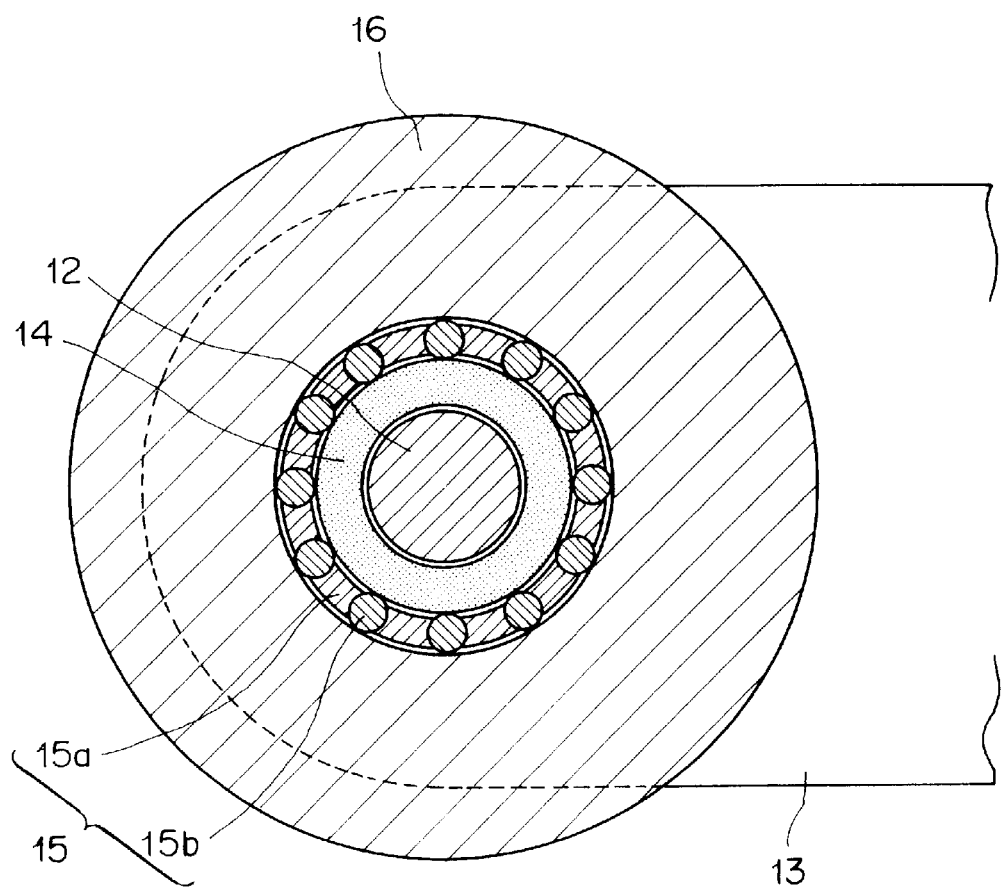
FIG. 2 is a sectional view taken along line A—A of FIG. 1.
Figure 3:
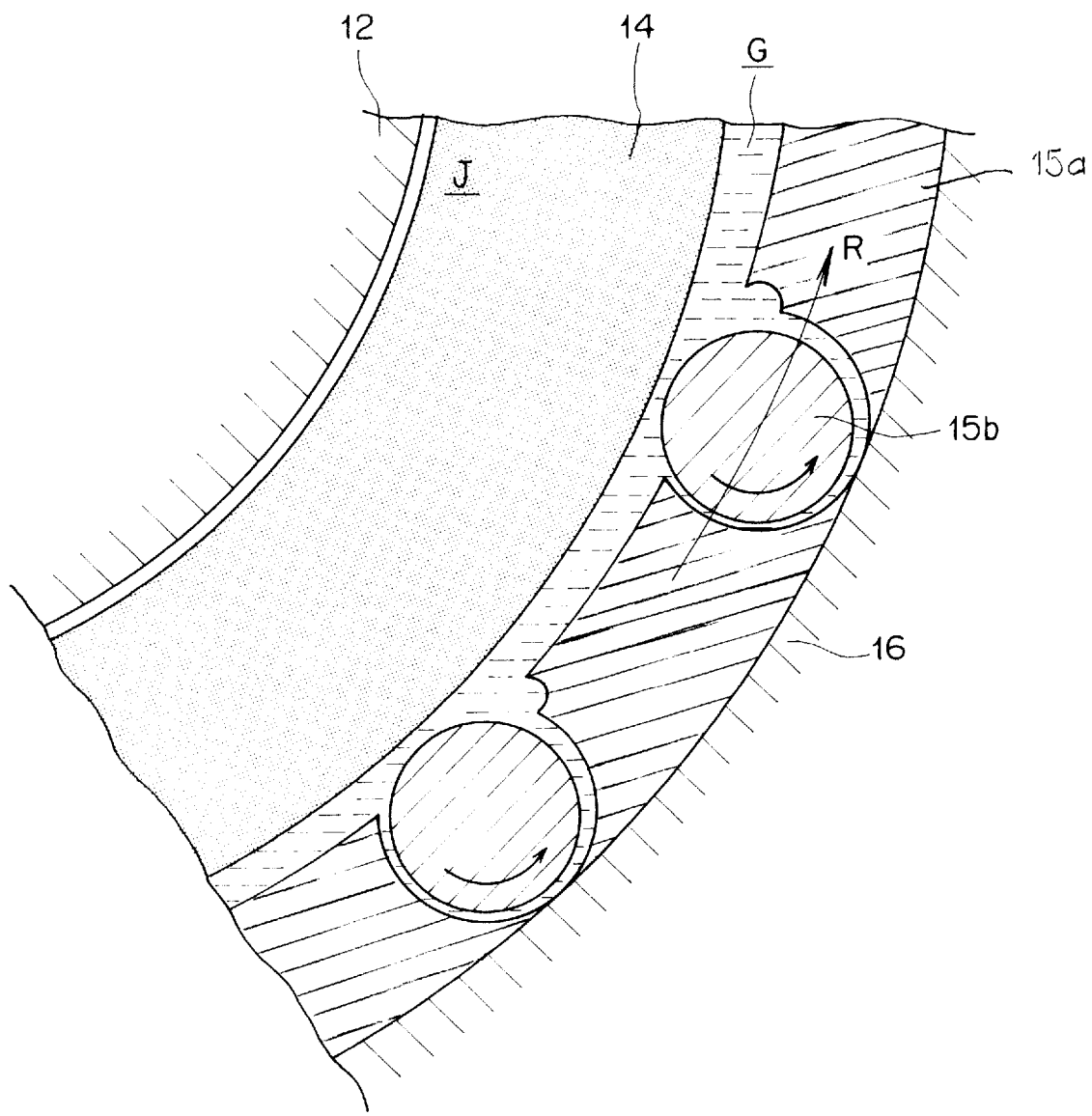
FIG. 3 is an enlarged partial sectional view of the roller chain of FIG. 1 illustrating a manner in which grease charged in a needle roller bearing is transferred.

Referring to FIGS. 1 to 3, there is shown a roller chain to which the present invention is applied. The roller chain is generally denoted at 10 and includes a sintered oil-impregnated bushing 14 force fitted in a pair of inner plates 13. The sintered oil-impregnated bushing 14 is loosely fitted coaxially on a connection pin 12 force fitted in a pair of outer plates 11. A roller 16 is provided coaxially with the connection pin 12 and the sintered oil-impregnated bushing 14 with a needle roller bearing 15 interposed between the roller 16 and the sintered oil-impregnated bushing 14.

A pair of guide rings 17 such as resin collars fitted around the sintered oil-impregnated bushing 14 are disposed between the inner faces of the inner plates 13 and the opposite end faces of the roller 16 in such a manner that they prevent contact between the inner plates 13 and the roller 16 thereby to suppress generation of heat from around the needle roller bearing 15 and prevent leakage of grease G from the opposite sides of the needle roller bearing 15.

It is to be noted that, in the present embodiment, as seen in FIG. 1, in order to achieve miniaturization of the roller chain itself, the width of the roller 16 on the inner periphery side is made smaller than the width of the roller 16 on the outer periphery side, and the roller width on the inner periphery side is set substantially equal to the width of the needle roller bearing 15 so as to produce spaces in which the guide rings 17 can be accommodated. To this end, the opposite end faces of the roller 16 has a pair of circular recesses 16a, 16a in which the guide rings 17 are partly received, respectively. The circular recesses 16a, 16a are concentrical with an axial central hole 16b of the roller 16.

The needle roller bearing 15 in the illustrated embodiment has a structure known per wherein a large number of needle rollers 15b made of steel are arranged and held in parallel to each other on holding members 15a in the form of inner and outer rings made of an engineering plastics material, and grease G is charged to form a roller bearing. However, any other structure may be employed only if a roller bearing is formed with grease G charged therein and the grease G can be transferred to an outer periphery of another member which contacts with and slides on the roller bearing.

Further, while the grease G charged in the needle roller bearing 15 in the present embodiment is determined relative to the kinetic viscosity of lubricant J, grease of the consistency number 2 is adopted.

When the roller chain 10 obtained in this manner is actually used, the frictional resistance between contact faces of the connection pin 12 and the sintered oil-impregnated bushing 14 can be reduced by the lubricant J impregnated in the sintered oil-impregnated bushing 14, and the frictional resistance between contact faces of the sintered oil-impregnated bushing 14 and the roller 16 can be reduced by the grease G charged in the needle roller bearing 15. Then, as shown in FIG. 3, when the chain runs, the needle roller bearing 15 slides in the direction indicated by an arrow mark R on the outer periphery of the sintered oil-impregnated bushing 14 by rotation of the running roller 16. In this instance, when the individual needle rollers 15b which form the needle roller bearing 15 roll on the outer periphery of the sintered oil-impregnated bushing 14, the grease G sticking to the individual needle rollers 15b is transferred to the outer periphery of the sintered oil-impregnated bushing 14, and a normally fresh film of the grease G is formed on the outer periphery of the sintered oil-impregnated bushing 14. Consequently, even if the lubricant J impregnated in the sintered oil-impregnated bushing 14 tends to pass through the film of the grease G and leak out toward the roller 16, it is intercepted by the film of the grease G and cannot leak out. Consequently, oil components of the lubricant J impregnated in the sintered oil-impregnated bushing 14 are assured effectively for a long period of time.

Then, even if oil components of the grease G charged in the needle roller bearing 15 side are used up or even if oil components of the lubricant J on the sintered oil-impregnated bushing 14 side become short, since the lubricant J on the sintered oil-impregnated bushing 14 side and the grease G on the needle roller bearing 15 side supply oil components to each other, occurrence of a local out-of-oil condition of the roller chain can be suppressed, and accordingly, the roller chain can be used for a long time without supplementing grease or lubricant.

As described above, the roller chain 10 according to the present invention exhibits a significant advantage in that the overall amount of oil components which the roller chain has can be utilized effectively and the roller chain 10 can be used for a long period of time without supplementing grease and that the frictional resistance is reduced to suppress running noise of the roller chain and smooth conveyance can be achieved.

While a preferred embodiment of the present invention has been described using specific terms, such description is for illustrative purposes only, and it is to be understood that changes and variations may be made without departing from the spirit or scope of the following claims.

What is claimed is:

1. A roller chain comprising:

a sintered oil-impregnated bushing loosely fitted coaxially on a connection pin for outer plates;

a roller fitted for rotation on and around said sintered oil-impregnated bushing; and a needle roller bearing interposed between said sintered oil-impregnated bushing and said roller and having grease charged therein.

2. A roller chain as claimed in claim 1, wherein said roller has a pair of circular recesses formed concentrically in opposite end faces thereof, and a pair of guide rings are accommodated in spaces defined by said opposite end faces of said roller and a pair of inner plates secured to the opposite ends of said sintered oil-impregnated bushing so as to prevent contact between said inner plates and said roller, said guide rings being partly received in said circular recesses.

* * * * *